Aug. 6, 1957

W. G. CARTER 2,801,659

PEACH PEELER

Filed April 26, 1954

INVENTOR,
WILLIAM G. CARTER
BY
Lyon & Lyon
ATTORNEYS

Aug. 6, 1957 W. G. CARTER 2,801,659
PEACH PEELER
Filed April 26, 1954 3 Sheets-Sheet 3
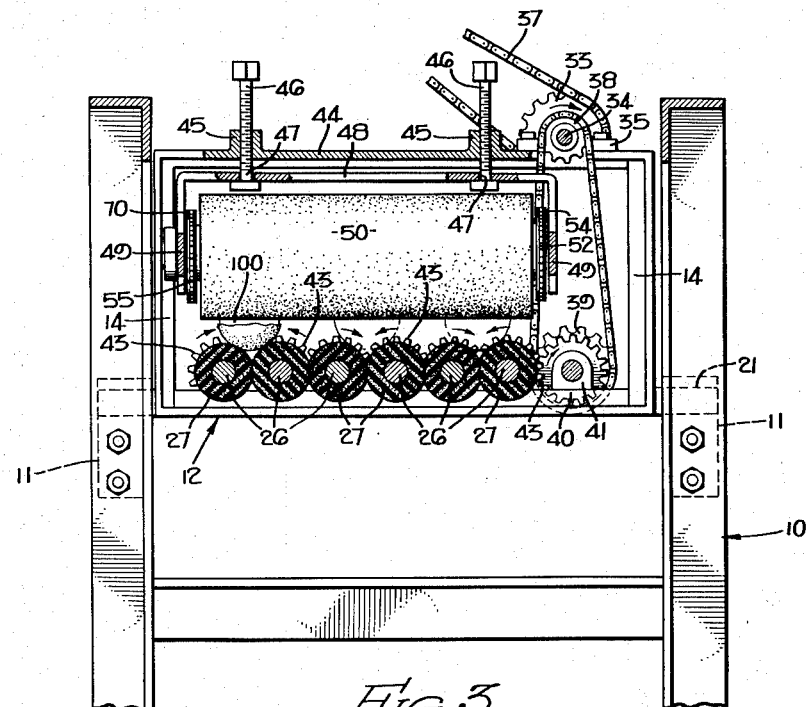
FIG. 3.
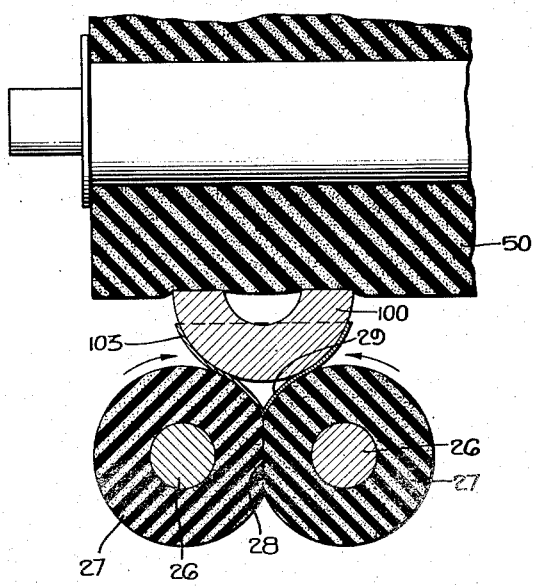
FIG. 5.
INVENTOR,
WILLIAM G. CARTER
BY
ATTORNEYS

United States Patent Office 2,801,659
Patented Aug. 6, 1957

2,801,659

PEACH PEELER

William G. Carter, Yakima, Wash., assignor to California Packing Corporation, San Francisco, Calif., a corporation of California Application April 26, 1954, Serial No. 425,411

3 Claims. (Cl. 146—44)

This invention relates to a fruit peeling machine and more particularly to an automatic device for peeling peaches, apricots and the like.

The invention is characterized by the fact that the halved fruit is presented to a peeler constituting pairs of oppositely rotating soft rubber rollers so as to get a carpet sweeper effect which will pinch off and completely remove the skin of the peach. The use of such oppositely rotating rollers for this purpose is not new with this invention. However, the invention includes the refinement of having such rollers pressed against each other under considerable tension so as to reduce the depth of the valley between the two rotating rollers and permit the fruit halves to approach more closely the line of junction between the two counter-rotating rollers.

The invention further includes as an important feature rollers superposed above the fruit and adapted to force properly positioned fruit down into the valleys between the lower counter-rotating rollers in position to have the skins removed, while the upper rollers serve the additional function of aiding in the advancement of the fruit through the machine and of scrubbing off skins from any fruit positioned with its skin side upward.

It is accordingly one object of the present invention to provide a peach peeler or the like which will more completely and economically peel the fruit.

It is a further object of this invention to provide a peeler of the type described involving counter-rotating rollers having a resilient surface pressed together under tension so as to reduce the valley between the rollers.

It is a further object of this invention to provide an apparatus of the type described having combination skinning and hold-down rollers superposed above the counter-rotating rollers.

These and other objects, features and advantages of the present invention will be apparent from the annexed specification in which:

Figure 3 is a partially vertical section taken on the line 3—3 of Figure 2.

Figure 4 is a plan section taken on the line 4—4 of Figure 2.

Figure 5 is an enlarged section taken through one set of rollers showing the method of pinching the skin of the halved peach with the eventual removal thereof.

Figure 1:
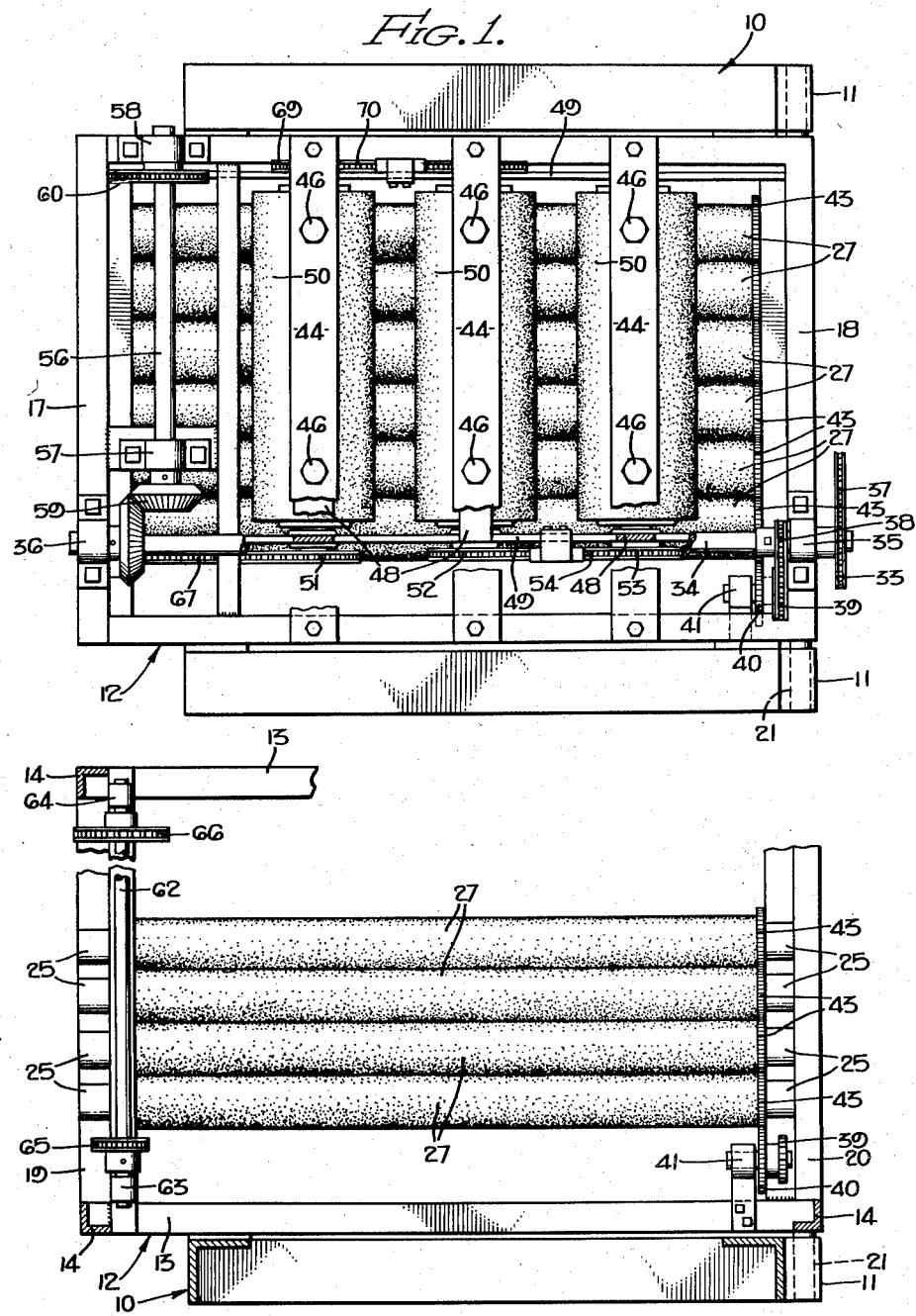
Figure 1 is a plan view of the peach peeler.

Referring now more particularly to the drawings, the invention is shown as including an angle iron frame 10 and an open box-like subframe 12 pivoted within the frame 10 by a rod 21 secured to the subframe and having its ends pivotally journaled in bearings formed by bearing brackets 11. The subframe is formed of spaced lower longitudinal angles 13, four generally upright corner angles 14, a pair of longitudinal upper angles 15 joined to the upright angles 14 by gusset plates 16, upper spaced transverse angles 17 and 18 and lower flat bars 19 and 20, the angles and bars thus cooperating to form an open box-like frame. The rod 21 is welded or otherwise suitably secured to the bar 20 and pivotally mounts the entire frame between the sides of the open main frame 10. An adjustable bracket 22 is pivoted at its upper end to a lug 23 carried by one of the angles 13 and at its lower end in one of the spaced and aligned holes 24 on the corner post of the frame 10.

It will be apparent that by affixing the lower end of the bracket 22 in any desired one of the holes 24, adjustment of the pitch of the subframe 12 can be made.

Mounted on each of the flat bars 19 and 20 are bearing members 25 in which are journaled the shafts 26 of rollers 27. The rollers are made of soft rubber molded on a tubular or solid shaft and are placed together in pairs.

As hereinafter explained, the rollers comprising a single pair are arranged to rotate in opposite directions and as most clearly shown in Figure 5, the rollers of each such pair are brought together under considerable pressure so that the soft rubber covering flattens as at 28 thus reducing the depth of the valley 29 at the top of the two adjoining rollers. An electric motor 30 is carried by the subframe 12 and its output shaft 31 drives a sprocket 32. A second sprocket 33 is mounted on a shaft 34 journaled in bearings 35 and 36 mounted upon the angles 17 and 18 as shown. A chain 37 is carried by the sprockets 32 and 33 and serves to drive the shaft 34. The shaft 34 also carries a sprocket 38, and a sprocket 39 and associated gear 40 are mounted in a bearing 41. A chain 42 is carried by the sprockets 38 and 39 and serves to drive the gear 40. Each of the rollers 27 at its upper end is provided with a gear 43 and as shown in Figure 3 each of the gears 43 meshes with the adjacent gear on the adjacent roller with the end gear 43 meshing with the gear 40. It will thus be appreciated that on rotation of the gear 40, the gears 43 and consequently the rollers 27 will be rotated in the direction shown by the arrows in Figure 3. It will be obvious, however, that in lieu of the gears 43, I may employ sprockets with a chain passing over one sprocket and under the next to obtain the same mechanical movement.

Mounted across the top of the open box-like subframe 12 are three spaced straps 44. Each of the straps 44 is provided with a pair of nuts 45 welded thereon, and the straps 44 are bored in alignment with the bores of the nuts 45 to receive the threaded studs 46. Each of the studs 46 extends through an opening 47 in a U-shaped bracket 48, the brackets 48 being joined together by a strap 49. Journaled in each of the U-shaped brackets 48 is a roller 50. The rollers 50 are likewise made of soft rubber molded on a tubular or solid shaft. The roller 50 disposed adjacent the discharge end of the machine has associated therewith a sprocket 51. The other two rollers have associated therewith respectively sprockets 52 and 53. A chain 54 extends between the sprockets 52 and 53. The center roller has associated therewith at the other end thereof a sprocket 55. A shaft 56 is journaled in bearings 57 and 58 and carries a bevelled gear 59 and a sprocket 60. The shaft 34 also carries a bevelled gear 61 meshing with the bevelled gear 59. A shaft 62 is journaled in bearings 63 and 64 and carries sprockets 65 and 66. A chain 67 is carried by the sprocket 65 and the sprocket 51, and a chain 68 is carried by the sprocket 66 and the sprocket 60. The roller 50 nearest the discharge end carries a second sprocket 69, and a chain 70 is carried by the sprockets 69 and 55.

Figure 2:
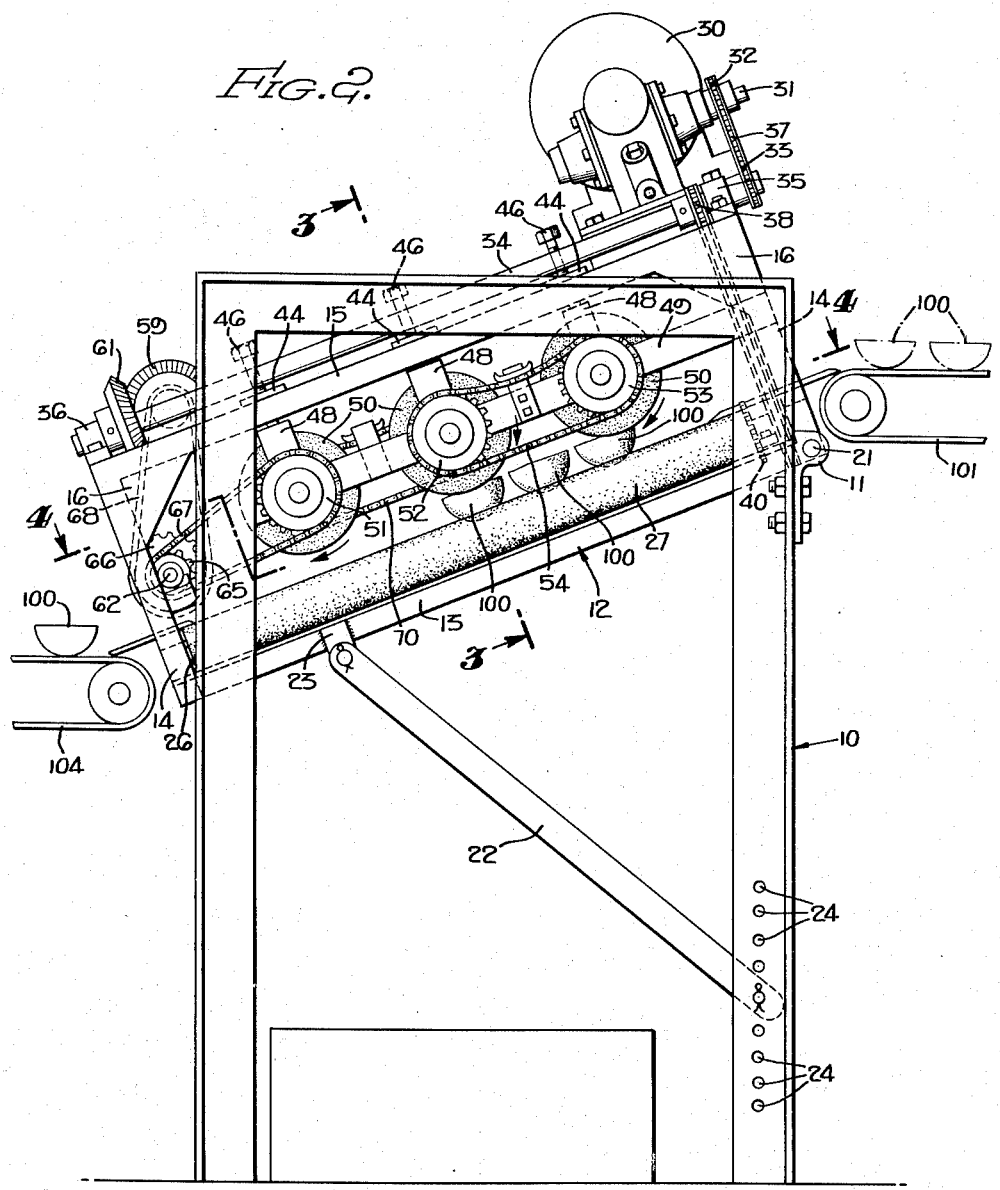
Figure 2 is a side view.

The operation of the above-described device is as follows: With peach halves 100 being presented to the peeling mechanism by suitable mechanisms such as the conveyor belt 101, the electromotor 30 is energized causing the rollers 27 to rotate in the direction shown by the arrows in Figure 3 and causing the rollers 50 to rotate in a clockwise direction as shown in Figure 2. The pressure of the rollers 50 upon the upwardly cupped peach halves will force the same down into the valley 29 formed between the pairs of counter-rotating rollers so that the skin 103 is pinched off. Should any of the fruit be presented to the machine inverted so that the skin thereof is contacted by the rollers 50, it has been found in practice that the rollers 50 will remove the skin of a large portion of fruit by abrading. The skins pass downwardly between the counter-rotating rollers 27 and are collected in a suitable bin, and the fruit 100 is discharged from the rollers 27 to a conveyor belt 104.

By reason of the adjustable nature of the support for the rollers 50, the same may be lowered or raised by means of the studs 46, thus applying a regulated pressure to the fruit being peeled. Flow of the fruit through the machine is a combination of gravity as the fruit passes down the inclined rollers 27 and a positive advancing of the fruit by the rollers 50. It will also be appreciated that the rollers 50 may be replaced by an overhead continuous belt and the same objectives obtained. Speed of flow of the fruit through the machine can be adjusted simply by means of the bracket 22 increasing or decreasing the pitch of the subframe 12. With machines of the type described running at a capacity of approximately one ton per hour, it was found possible to obtain 85% efficiency in the peeling of Freestone peaches.

While there has been described what is at present considered a preferred embodiment of the present invention, it will be appreciated by those skilled in the art that various changes and modifications can be made therein without departing from the essence of the invention and it is intended to cover herein all such changes and modifications as come within the true spirit and scope of the appended claims.

I claim:

1. Fruit peeling apparatus comprising: a frame; a plurality of rollers mounted in said frame in position to be engaged by fruit passing therethrough, said rollers having a resilient surface and being arranged in pairs rotating in opposite directions from each other; said rollers of each such pair being engaged under pressure whereby the depth of the valley between them is reduced; and means comprising a plurality of resilient rollers, each arranged transversely to the path of said fruit, spaced from said rollers in position to engage the other side of said fruit and rotating in a direction to assist said fruit to travel through said apparatus.

2. Fruit peeling apparatus comprising: a frame; a plurality of rollers mounted in said frame in position to be engaged by fruit passing therethrough, said rollers having a resilient surface and being arranged in pairs rotating in opposite directions from each other; said rollers of each such pair being engaged under pressure whereby the depth of the valley between them is reduced; means comprising a plurality of resilient rollers, each arranged transversely to the path of said fruit, spaced from said rollers in position to engage the other side of said fruit and rotating in a direction to assist said fruit to travel through said apparatus; and said last mentioned means being arranged to engage said fruit with pressure and to urge the same into said valley.

3. Fruit peeling apparatus comprising: a frame; a plurality of rollers mounted in said frame in position to be engaged by fruit passing therethrough, said rollers having a resilient surface and being arranged in pairs rotating in opposite directions from each other; said rollers of each such pair being engaged under pressure whereby the depth of the valley between them is reduced; means comprising a plurality of resilient rollers, each arranged transversely to the path of said fruit, spaced from said rollers in position to engage the other side of said fruit and rotating in a direction to assist said fruit to travel through said apparatus; said last mentioned means being arranged to engage said fruit with pressure and to urge the same into said valley; means for adjusting the pressure with which said fruit is so engaged; said rollers being arranged parallel to the path of the fruit and disposed at an angle downward from horizontal; and means for adjusting said angle.

References Cited in the file of this patent

UNITED STATES PATENTS

| Number | Name | Date |
|---|---|---|
| 421,681 | Dexter | Feb. 18, 1890 |
| 719,617 | Scovill | Feb. 3, 1903 |
| 892,208 | Baird | June 30, 1908 |
| 1,867,955 | Ryder | July 19, 1932 |
| 2,048,470 | Sanborn | July 21, 1936 |
| 2,342,358 | Minera | Feb. 22, 1944 |
| 2,616,819 | Ford | Nov. 4, 1952 |
| 2,699,808 | Lowe | Jan. 18, 1955 |